US011056107B2

(12) United States Patent
Nahamoo et al.

(10) Patent No.: US 11,056,107 B2
(45) Date of Patent: Jul. 6, 2021

(54) CONVERSATIONAL FRAMEWORK

(71) Applicant: International Business Machines Corporation, Armonk, NY (US)

(72) Inventors: David Nahamoo, Great Neck, NY (US); Lazaros Polymenakos, West Harrison, NY (US); Nathaniel Mills, Coventry, CT (US); Li Zhu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/128,012

(22) Filed: Sep. 11, 2018

(65) Prior Publication Data

US 2019/0304445 A1    Oct. 3, 2019

Related U.S. Application Data

(60) Provisional application No. 62/650,455, filed on Mar. 30, 2018.

(51) Int. Cl.
  *G10L 15/22* (2006.01)
  *H04L 29/08* (2006.01)
  *G10L 15/18* (2013.01)

(52) U.S. Cl.
  CPC .............. *G10L 15/22* (2013.01); *G10L 15/18* (2013.01); *H04L 67/327* (2013.01); *G10L 2015/223* (2013.01); *G10L 2015/225* (2013.01)

(58) Field of Classification Search
  CPC ... G10L 15/22; G10L 15/18; G10L 2015/223; G10L 2015/225; H04L 67/327

(Continued)

(56) References Cited

U.S. PATENT DOCUMENTS

| | | | |
|---|---|---|---|
| 2007/0162560 A1* | 7/2007 | Jin ...................... | G06Q 10/10 709/217 |
| 2010/0131260 A1* | 5/2010 | Bangalore ............... | G10L 15/22 704/3 |

(Continued)

OTHER PUBLICATIONS

S. Kumaran, R. Liu, P. Dhoolia, T. Heath, P. Nandi and F. Pinel, "A RESTful Architecture for Service-Oriented Business Process Execution," 2008 IEEE International Conference on e-Business Engineering, Xi'an, 2008, pp. 197-204, doi: 10.1109/ICEBE.2008.82. (Year: 2008).*

(Continued)

*Primary Examiner* — Bharatkumar S Shah
(74) *Attorney, Agent, or Firm* — Scully, Scott, Murphy & Presser, P.C.; Anthony R. Curro

(57) ABSTRACT

A computer-implemented conversational system framework to perform tasks associated with a client request. A conversation application executing on a hardware processor provides application workflow orchestration, the conversation application receiving a client request and sending one or more application requests based on the application workflow orchestration. A conversation system executing on a hardware processor provides conversation workflow orchestration, the conversation system receiving the one or more application requests. The conversation application and the conversation system develop dialog context and store the dialog context in a memory device. The conversation application and the conversation system develop the dialog context by invoking at least one micro-service to perform tasks associated with the one or more application requests. The conversation application generates a response to the client request based on the developed dialog context.

20 Claims, 8 Drawing Sheets

(58) Field of Classification Search
USPC .......................................................... 704/200
See application file for complete search history.

(56) References Cited

U.S. PATENT DOCUMENTS

2016/0344777 A1* 11/2016 Fahlgren ............. H04L 65/1069
2016/0373552 A1* 12/2016 Chakra ................... H04L 67/02
2019/0115016 A1* 4/2019 Seok ........................ G10L 15/22

OTHER PUBLICATIONS kitt.ai, "ChatFlow", http://kitt.ai/, kitt.ai, Accessed on Sep. 11, 2018, 4 pages.
Rasa, "Build great conversational AI in-house", Rasa Technologies GmbH, Accessed on Sep. 11, 2018, 6 pages.
Chan, C., "The Chatbot Landscape, 2017 Edition", the KeyReply blog, https://blog.keyreply.com/the-chatbot-landscape-2017-edition-ff2e3d2a0bdb, Jun. 26, 2017, Accessed on Sep. 11, 2018, 1 page.
Nguyen, M.-H., "The latest market research, trends & landscape in the growing AI chatbot industry", Business Insider, https://www.businessinsider.com/chatbot-market-stats-trends-size-ecosystem-research-2017-10, Oct. 20, 2017, Accessed on Sep. 11, 2018, 5 pages.

* cited by examiner

CONVERSATIONAL FRAMEWORK

CROSS-REFERENCE TO RELATED APPLICATIONS

This application claims the benefit of U.S. Provisional Application No. 62/650,455, filed on Mar. 30, 2018, which is incorporated by reference herein in its entirety.

BACKGROUND

In recent years, conversational systems have experienced a shift from casual chit-chat experiences to more guided, task-specific interactions. Goal-oriented dialog systems are designed to address particular user needs for a well-defined objective in a timely and effective manner. Examples of such systems are information seeking and/or providing; focusing on the completion of a task (e.g., reservations); making recommendations regarding user options; or any combination of such goals. Conversation is viewed not just as a standalone system, but as a general interface to bigger and complex applications with many modules, knowledge bases and business logic components. Thus, inventors in the present application have recognized that conversational systems should able to take advantage of application specific data both during design and during operation. Such conversational systems should be able to maintain a consistent context that governs all components, and allow both the separation of logic and the ability for tight coupling of the application and the conversational components without leading to spaghetti code and unmanageable systems. Further, they should make it easy for incremental development of complex conversational applications, e.g., by enabling extension and continuous evolution of application logic, knowledge bases, and human interaction behavior patterns.

BRIEF SUMMARY

A computer-implemented method and system may be provided. A method, in one aspect, may include receiving a client request by a conversation application and initiating a dialog in a conversation thread. The method may also include conducting a workflow orchestration associated with the dialog, the workflow orchestration communicating requests to a conversation system to perform conversation related workflow tasks by invoking at least one micro-service. The method may further include receiving by the conversation application a response returned by the conversation system as a result of invoking the at least one micro-service, the conversation application determining application tasks and responding to the client request based on the response returned by the conversation system.

A conversational system, in one aspect, may include a conversation application executing on at least one hardware processor and providing application workflow orchestration, the conversation application receiving a client request and sending one or more application requests based on the application workflow orchestration. A conversation system executes on at least one hardware processor and provides conversation workflow orchestration, the conversation system receiving the one or more application requests. The conversation application and the conversation system develop dialog context and store the dialog context in a memory device, the conversation application and the conversation system developing the dialog context by invoking at least one micro-service. The conversation application generates a response to the client request based on the developed dialog context.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

Features as well as the structure and operation of various embodiments are described in detail below with reference to the accompanying drawings. In the drawings, like reference numbers indicate identical or functionally similar elements.

DETAILED DESCRIPTION

A system, method and technique may be provided, which enable a mixture of inferencing, machine learning, and procedural logic components to be managed by workflow orchestration for application and conversation processes. In some aspects, a system in some embodiments accomplishes the separation of application and conversation logic by using two different component groups comprising Conversation Application components and Conversational System components, for example, described with reference to FIGS. 1, 2, and 3 in some embodiments.

A conversational systems framework in some embodiments provide for modularity, extendibility, separation of application logic from conversational logic, orchestration among different modules, coordination across different conversational bots, and uniform handling of context. Implementation features of the framework may include: intuitive graphical development environment, easy to use component interfaces, and support for conversation components that were developed and deployed on different application interface technologies leveraging WebSockets, Representational State Transfer Application Programming Interfaces (REST API's) and Cloud Functions. The framework may allow for fast and consistent (repeatable) development of conversational systems, support implementation and experimentation in the absence of all needed components, and provide targeted ways to maintain, repair, extend and update the overall system once deployed. The framework in some embodiments allow for component (micro) service definition and deployment, component orchestration, application call-backs, and context handling.

Figure 1:
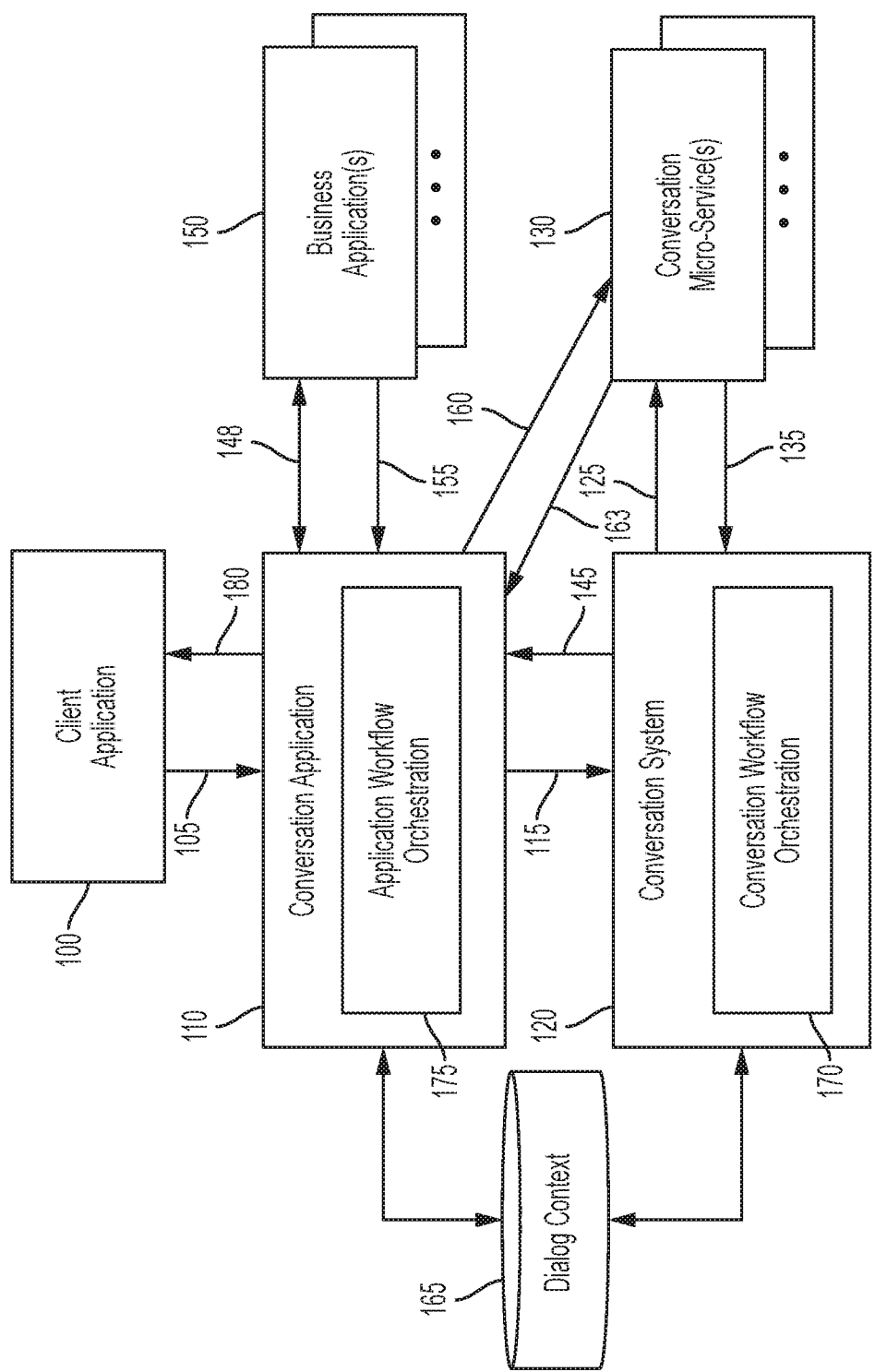
FIG. 1 illustrates a system overview in one embodiment.

FIG. 1 illustrates a system overview in one embodiment. Referring to FIG. 1, from a bird's eye view, a Client Application (100) employing conversation as part of the user experience engages with a Conversation Application (110) that leverages one or more Conversation Systems (120) to converse by generating responses to client requests. In some embodiments, this is accomplished by the Client Application (100) sending a Client Request (105) containing input, e.g., text input, to the Conversation Application (110). The Conversation Application may then send one or more Application Requests (115) to one or more Conversation Systems (120) as directed by its Application Workflow Orchestration (175). Both the Conversation Application and Conversation System use and develop Dialog Context (165) by leveraging Conversation Micro-Services (130) and Business Applications (150) as directed by the Application and Conversation Workflow Orchestrations (175, 170) until a Client Response (180) can be returned to the Client Application (100). Business Applications (150), for example, includes entity or organization specific applications.

A Conversation System (120), in some embodiments, is a computer system developed to respond to (a subset of all possible) human language input and to provide responses based on implicitly (from data) or explicitly (programmed) known possible paths of interaction towards the completion of a goal. A Conversation Application (110), in some embodiments, is a computer system that includes an application that uses one or more conversational systems and additional knowledge based and internal or external modules in order to allow natural language interaction with its business application logic and knowledge bases and to enable a user to complete tasks. A Conversation Application (110) is also referred to as a Dialog Enabled Application. In some embodiments, tasks are defined in building a system involving conversation for solving or achieving the tasks. A task may satisfy one or more goals that a user of the system may pursue to complete. Likewise, a user goal may be satisfied by the completion of one or many identified tasks. For example, a user may have as a goal to organize an affordable vacation for the user's family. This may be combined with additional goals like information gathering about travel options or destinations, activities exploration, consulting weather conditions, and/or others. This goal may be achieved by a travel booking system which allows the user to complete the following or additional not listed tasks: find and present destination options, provide price information for different trip options, book the different aspects of a family trip (transportation, lodging, activities), and finally provide reliable and secure billing for the trip that best fits the user's price criteria.

The Conversation Application Orchestration (175) provides orchestration of one or more Conversation Systems (120) by sending an Application Request (115) that triggers the Conversation Workflow Orchestration (170) in the Conversation System (120). The Conversation Workflow Orchestration (170) processes the Application Request (115) and may call one or more Micro-Service Proxies (340.x, FIG. 3) with a Conversation Request (330.x, FIG. 3). The Micro-Service Proxies (340.x) engage with Conversation Micro-Services (130) using a Micro-Service Request (125). The Micro-Service Request (125) may contain portions of Dialog Context (165) needed by the micro-service to perform its function and to generate a Micro-Service Response (135). Dialog Context (165) is able to be updated by content from the Micro-Service Response (135) during Conversation Workflow Orchestration (170). Dialog Context (165) is accumulated as the workflow progresses. In cases where the state of Dialog Context (165) is sufficient to provide an Application Response (145), one is generated and returned to the Conversation Application Orchestration (175).

There may be other intermediate cases that require additional data or disambiguation from, or further analysis by Business Applications (150) such as a plugin application. In this case Conversation Workflow Orchestration (170) is suspended and a "call back" is returned in an Application Response (145) for the Conversation Application Orchestrator (175) to act upon. The Conversation Application's (110) Application Workflow Orchestration (175) may trigger a Business Request (148) to be sent to a Business Application (150) for processing. When done processing, the Business Application (150) responds with a Business Response (155). The Conversation Application (110) may also contact a Conversation Micro-Service (130) for data and/or for processing by issuing a Micro-Service Request (160) and receiving a Micro-Service Response (163). These responses are further processed to augment the Dialog Context (165) and the Conversation Application may engage the Client Application (100) for disambiguation by returning a Client Response (180), and/or may re-engage the Conversation System (120) to resume Conversation Workflow Orchestration (170). At some point the Conversation System (120) and Conversation Application (110) achieve a state in the Dialog Context (165) enabling generation of the final Client Response (180) corresponding to the initiating Client Request (105). This constitutes one dialog turn in a conversation thread, and the process is repeated until the Client Application (100) is satisfied with the results and has either achieved its goal or is aware the goal is unachievable.

Figure 2:
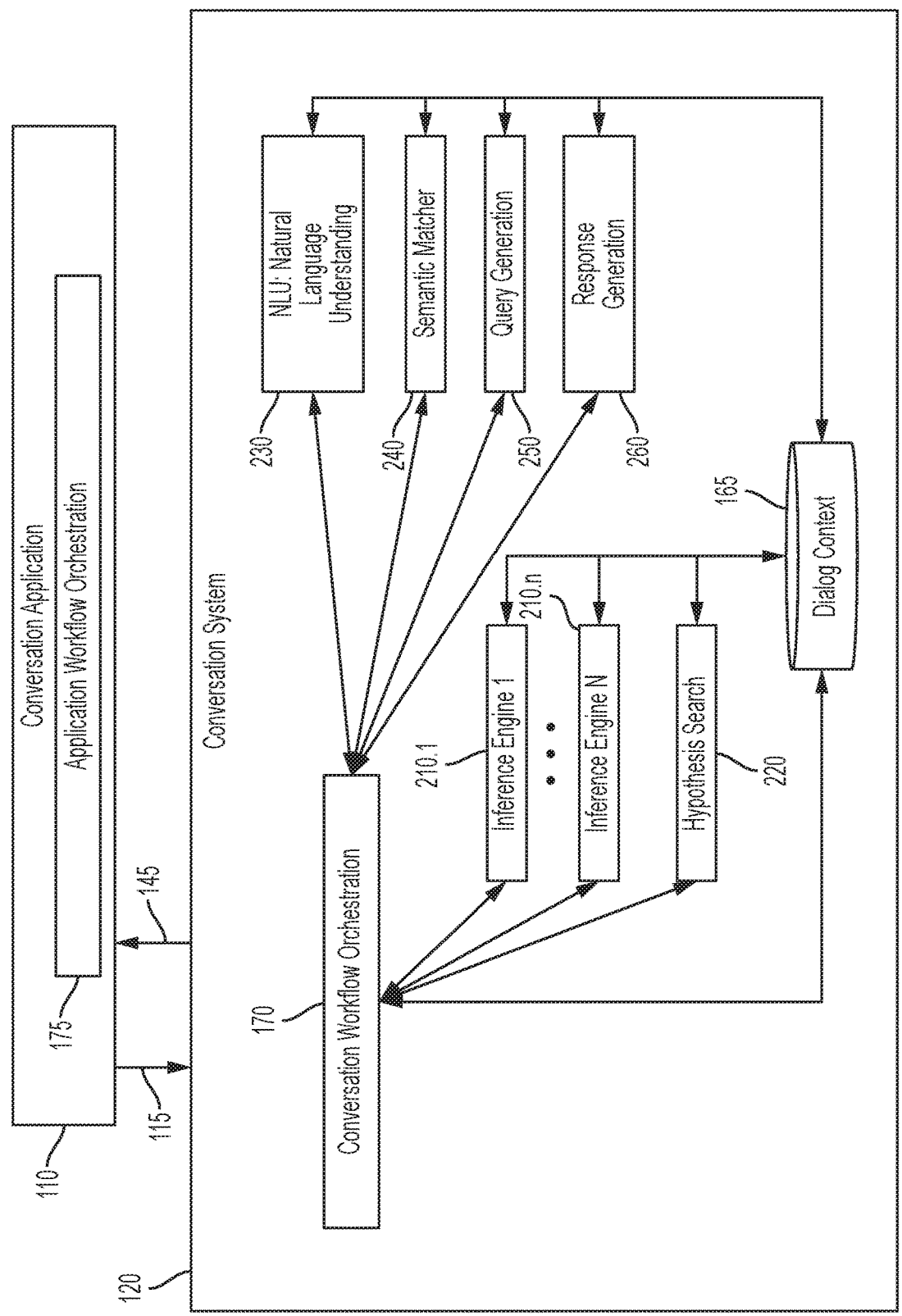
FIG. 2 is a diagram illustrating components of a conversation system in one embodiment.

FIG. 2 shows a conversation system in more detail in one embodiment. The various Conversation Micro-Services (130) may be classified as follows in one embodiment: Inference Engine(s) (e.g., 210.x, 210.1, . . . , 210.n shown); Hypothesis Search (220); NLU (230); Semantic Matcher (240); Query Generation (250); Response Generation (260). The conversation system 120, in some embodiments, also includes a Conversation Workflow Orchestration (170), communicates with a Conversation Application (110) and Conversation Application's Application Workflow Orchestration (175), and also accesses and/or builds a Dialog Context (165).

In some embodiments, the system and methodology of the present disclosure support Client Application (100)'s Client Requests (105) by leveraging the Conversation Application (110) that communicates via its Application Workflow Orchestration (175) with one or more Conversational System's (120) Conversation Workflow Orchestrator (170) to eventually generate and return a Client Response (180). The Application Workflow Orchestration's (175) forwards an Application Request (115) containing Dialog Context (165) and/or input from the Client Request (105) to the Conversation System (120) and receives an Application Response (145) after the Conversation Workflow Orchestration (170) has engaged with the Conversation Micro-Services (130) and as dictated by the state of the Dialog Context (165). Embodiments of the Conversation Micro-Services (130) of the Conversational System (120) are classified as described below, along with the description of the Conversation Workflow Orchestration (170).

Conversation Workflow Orchestration (170): In some embodiments, this component analyzes the current Dialog Context (165) and maps it to a dialog state, e.g., one of the known/expected intermediate steps on implicitly known (from data) or explicitly programmed (encoded) paths of evolution of the conversation between the Client Application (100), the Conversation Application (110), and the Conversation System (120) towards the completion of the task. In some embodiments, this mapping is used for the Inference Engine(s) (210.*x*) to decide or infer the next step in the conversation (which can be the complete/final answer the Client Application (100) is expecting, or a confirmation of the completion of a task; a disambiguation request; or a parameter gathering request, or the like) for the Application Workflow Orchestration (175). The Conversation Workflow Orchestration (170) may also engage a Hypothesis Search (220) to search Dialog Context (165) to decide upon the best predicted dialog path from the available options provided by the Conversation Workflow Orchestration (170) and/or the Inference Engines (210.*x*) towards the completion of the goal of the dialog.

Inference Engine(s) (210.*x*, e.g., 210.1, . . . , 210.*n* shown): In some embodiments, these components are specific to a particular type of/pattern of dialog interaction: non-exhaustive examples include dialog interaction patterns with a particular structure of data and a dialog interaction handling different types of human behavior as it applies to the conversational system as a whole or to specific dialog interaction with structured data. Inference Engines can be viewed as specialized engines used to help break-up (decompose) the Conversation Workflow Orchestration (170) tasks (dialog flow management tasks) to a finite set of specialized reasoning/deciding engines whose results can be combined to provide an eventual Client Response (180) (e.g., an answer) to the Client Application (100). Responses of the inference engines become part of the Dialog Context (165). For example, in WCS, the frames implementation can be considered an inference engine for form interaction and is integrated in the bigger and more general dialog flow engine. In this example, the frames component allows for faster, consistent and repeatable implementation of the forms pattern of dialog interaction than encoding it in the dialog flow tree.

Hypothesis Search (220): In some embodiments, this component searches the Dialog Context (165) including the results of Inference Engines (210.*x*) in order to decide on the best predicted dialog path from the available options provided by the Application and Conversation Workflow Orchestrations (175, 170) and/or the Inference Engines (210.*x*) towards the completion of the goal of the dialog. By choosing the best predicted dialog path, the next Client Response (180) to the Client Application (100) is also decided. This component may be part of the implementation of the Dialog Flow, e.g., in Watson Conversation System ("WCS"), and it may be explicitly programmed in the nodes of the dialog tree.

NLU (230) (Contextual) Natural Language Understanding: The present disclosure collectively refers to NLU as components that are responsible to analyze natural human language input and extract features/parameters that can then be mapped to a semantic representation—e.g., assign a known meaning along with related parameters to the entire human language input, and parts thereof that originated in the Client Request (105) and further enhanced in the Application Request (115). For example, in Watson Conversation System ("WCS"), an NLU includes an intent classifier and an input text matcher for assigning entities/slots/values. The system of the present disclosure may include additional and more elaborate NLU components that take into account not only the current client input but also the Dialog Context (165) in order to deal with various natural language phenomena like ellipsis, anaphora, utterances about (changing or repairing) other utterances, long and rambling user input. Furthermore, multiple NLU's (230) may be used by the Conversation Workflow Orchestration (170) to ensure that the best representation of the client input is derived by combining trained artificial intelligence, fuzzy matching, regular expressions, language expansion and transformation.

Semantic Matcher (240): In some embodiments, this component matches the extracted NLU parameters to one or more of the expected, task-related representations. For example, in Watson Conversation System ("WCS"), this operation may occur within a node in a Dialog Flow directed graph, where the extracted NLU parameters are matched to one node in the Dialog Flow—that node is the task-related representation.

Query Generation (250): In some embodiments, this component is based on the task-representation of the extracted parameters (intents, entities, context values) and maps them to an appropriate knowledge base query. Such queries can be of the form of: a structured query language (SQL) query to a database; of a SPARQL Protocol and RDF Query Language (SPARQL) query to a Graph Database; of an application programming interface (API) call to an Application Service or Object Store; of a call to a Question Answering (QA) system; and/or others. For example, in Watson Conversation System ("WCS"), this operation may be one of the actions that can be taken within the logic a node of the Dialog Flow.

Response Generation (260): In some embodiments, this component converts the next step inferred by the Application and Conversation Workflow Orchestration (175, 170) into a suitable Client Response (180) to the Client Application (100). This may involve formatting the response into appropriate language with the appropriate parameters inserted, and the appropriate encodings for response tone, style, emotion. For example, in Watson Conversation System ("WCS"), this may be also included in the Dialog Flow node where it may be completely or parametrically scripted.

Dialog Context (165): In some embodiments, this component includes the dialog history, the Applications and Conversation Workflow Orchestration (175, 170) history, the outputs from the NLU and Semantic Matching microservices, and all additional variables that have been passed as parameters to, and the response data from other Conversation Micro-Services (130) and Business Applications (150). For example, the following can be part of the dialog context: a) the collected information about intent(s) and entities and slot values collected from the current client input along with the ones identified from previous client inputs, profile variables, or data directly set by a calling application API's and b) the history of the system responses and actions, c) (e.g., structured) results of query/retrieval, d) the evolving dialog state and possible next steps/responses as encoded by the Application and Conversation Workflow Orchestration (175, 170). They define the (e.g., growing) conversational context which is passed among conversational components, and between the Conversation System (120), the Conversation Application (110), and the Client Application (100).

A Conversation Application (110) may include one or more components including multiple Conversational Systems (120), proprietary or third-party databases and knowledge bases, plugins to internal or external applications (e.g., Business Applications (150)), and modules that encode business logic, compliance logic, algorithmic logic, and/or others. The Conversational Systems (120) are used as the input methodology and the conversational components (e.g., Conversation Micro-Services (130)) encode the analysis of Client Requests (105) and Application Requests (115), derived Dialog Context (165), and the dialog paths that allow the interaction with all the application and conversation components necessary to complete a task as dictated by the Application and Conversation Workflow Orchestration (175, 170).

In some aspects, in designing and implementing conversational enablement of complex applications, conversational development methodologies of the present disclosure need not require re-encoding of all the application logic and component functionality managed at the Conversation Application (110) into the modules of the Conversation System (120). For instance, the methodologies of the present disclosure support the developer to separate the process(es) by which the Conversation Application (110) and Conversation System (120) collect and provide necessary information for the Client Application (100), from the application logic to process this information, and thus allow the Client Application (100) to complete a set of tasks.

Figure 3:
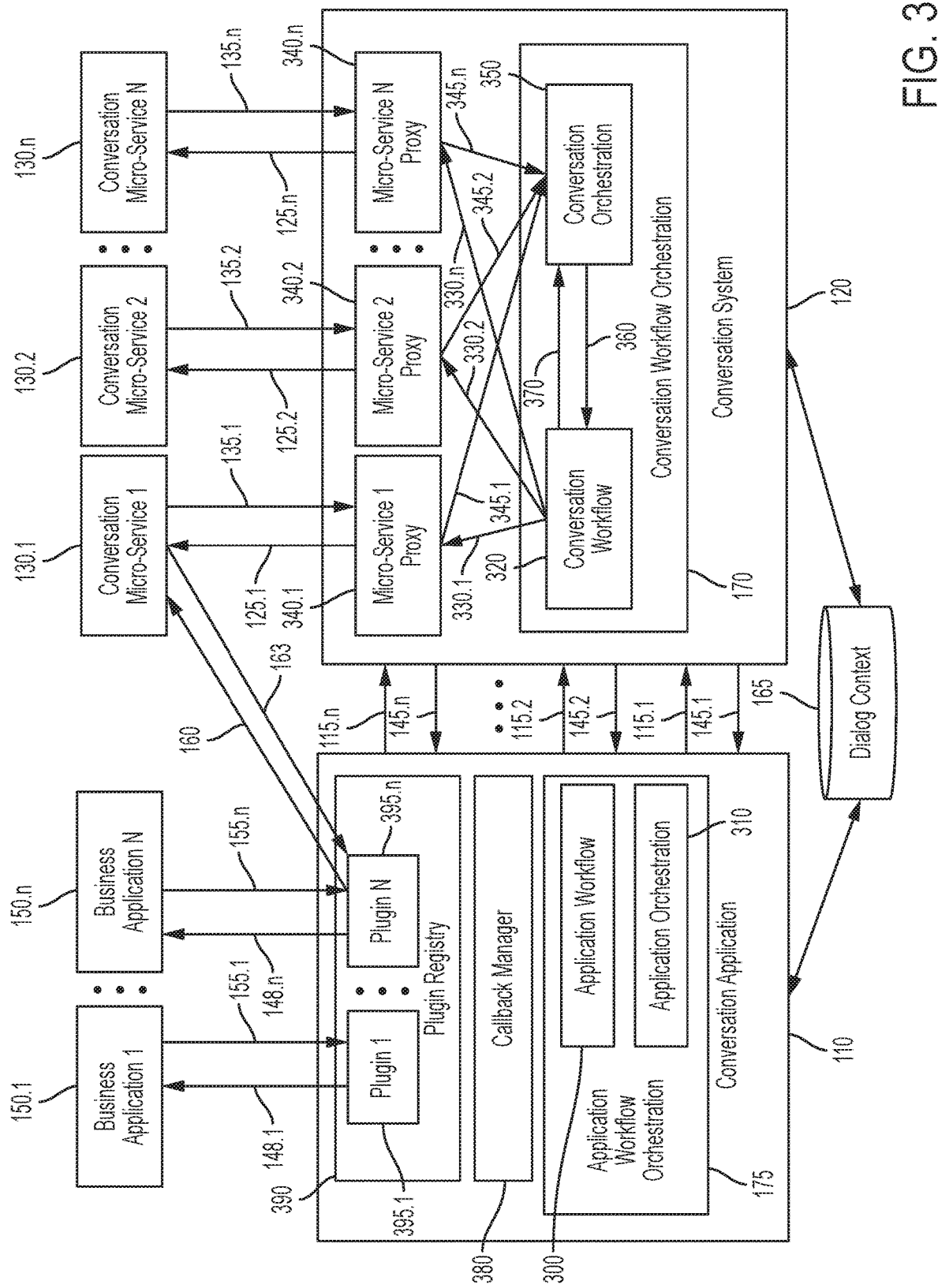
FIG. 3 is a diagram illustrating an architectural framework of a conversation system in one embodiment.

FIG. 3 shows a conversation framework in one embodiment. In some aspects, orchestrating among various Conversation Application (110) and Conversation System (120) components fulfills the Client Application (100) goals. In some embodiments, there are additional types of orchestration which may build robust conversation applications. For example, coordinated interaction of the orchestrated conversation system components with the application orchestration logic may provide for disambiguation or retrieval of user models or other application data complementing the original user input. To present the overall framework and illustrate the separation of application and conversational logic in the design, as well as addressing security of proprietary data and APIs, the conversation framework may be divided into two major sub-systems: each addressing the Conversation Application (110) and the Conversation System (120), respectively.

The Conversation Application (110) includes its portion of the Dialog Context (165) store and management, a Plugin Registry (390) and Plugins (395.*x*) to proprietary or external applications and databases (Business Applications (150.*x*), a Callback Manager (380) responsible for calling upon the Plugin Registry (390) to execute one or more Plugins (395.*x*) as directed by Application Orchestration (310) reacting to Dialog Context (165) state, and Application Responses (145.*x*) during the suspension of the Conversation Workflow Orchestration (170). The Conversation Application (110) manages all communications with the Client Application (100), acting upon Client Requests (105) and returning Client Responses (180).

The Application Workflow Orchestration (175) may comprise two components: Application Workflow (300) and Application Orchestration (310). The Application Workflow (300) is responsible for issuing an Application Request (115.*x*) to the proper Conversation System (120) or calling upon the Callback Manager (380) to execute a Plugin (395.*x*) via the Plugin Registry (390) depending on the Dialog Context (165) state. The result of the Callback Manager (390) processing and the Dialog Context (165) is reviewed by the Application Orchestration (310) to determine how workflow should be processed, altered, and addressed by the Application Workflow (300), or if a Client Response (180) should be returned to the Client Application (100). The Application Workflow (380) executes the next workflow step that may result in it sending an Application Request (115.*x*) to the Conversation System's (120) Conversation Workflow (320) component or calling the Callback Manager (380) for business logic processing.

The Application Orchestration (310) is responsible for evaluating and processing Application Responses (145.*x*) from the Conversation System's (120) Conversation Workflow Orchestration's (170) Conversation Orchestration (350). Application Orchestration (310) evaluates the Dialog Context (165) and Application Response (145.*x*) to determine whether application workflow should continue as planned or be changed and processed by the Application Workflow (300), or if a Client Response (180) should be returned to the Client Application (100).

The Conversational System (120) may include a dynamic Conversation Workflow Orchestrator (170) which decides during runtime, the optimal Conversation Micro-Services (130) workflow using Dialog Context (165) state and Conversation Response (345.*x*) processing and additional routing logic performed by its Conversation Orchestration (350). The Conversational System (120) also may include Micro-Service Proxies (340.*x*) that provide access to Conversation Micro-Services (130.*n*) (e.g., REST Services and/or Cloud Functions comprising various conversational component logic, or any other third-party components that the designer/developer wants to employ in order to develop a highly performing conversational system). The Conversation Workflow (320) component of the Conversation Workflow Orchestration (170) is responsible for setting up the Conversation Request (330.*x*) and communicating with the Micro-Service Proxy (340.*x*). The Conversation Response (345.*x*) returned from the Micro-Service Proxy (340.*x*) is processed by the Conversation Orchestration (350) component.

The Micro-Service Proxy (340.*x*) is responsible for marshalling a mixture of constant values and transformations of Dialog Context (165) into the Micro-Service Request (125.*x*), and either calling upon a Conversation Micro-Service (130.*x*) or providing a simulated call that provides a simulated response. The Micro-Service Response (135.*x*) or the simulated response is parsed, and portions may be used to update the Dialog Context (165) by the Micro-Service Proxy (340.*x*).

The conversation workflow executed by the Conversation Workflow (320) may contain references to both required and optional Micro-Service Proxy (340.*x*) references. The Micro-Service Response (135.*x*) or simulated response is transformed into the Conversation Response (345.*x*) in the Micro-Service Proxy (340.*x*) and is forwarded to the Conversation Orchestration (350). The Conversation Orchestration (350) executes logic to evaluate the state of the Dialog Context (165) to determine whether the conversation workflow should be revised, the Dialog Context (165) should be updated, or if an Application Response (145.*x*) should be returned to the Application Orchestrator (310) in the Application Workflow Orchestration (175). If the conversation workflow and/or Dialog Context (165) has been revised, but no Application Response (145.*x*) is required, the Conversation Orchestration (350) can forward a Workflow Request (360) to the Conversation Workflow (320) and the process repeats until an Application Response (145*x*) is produced.

In cases where the Conversation Orchestration needs to suspend the conversation workflow (e.g., for disambiguation, or to call another Conversation System (120), it generates an Application Response (145.*x*) to make a "callback" to the Conversation Application (110) so its Application Workflow Orchestration's (175) can determine what processing is required. It may configure the application workflow for the Application Workflow (300) to call upon the Callback Manager (380) to call the Plugin Registry (390) to invoke one or more Plugins (395.n). Plugins (395.n) make a Business Request (148.1) to a Business Application (150.x) (e.g., entity specific application) to gather business data and/or affect business logic that results in the return of a Business Response (155.x) to cause the Dialog Context (165) to be updated. Plugins (395.x) may also invoke a Micro-Service Request (160) to a Conversation Micro-Service (130.1) to elicit a Micro-Service Response (163) to cause the Dialog Context (165) to be updated. The output of the Callback Manager (380) is processed by the Application Orchestration (310) to determine what happens next.

In some aspect, Plugins (395.n) may be customer generated code registered with a conversation framework to perform services. Plugins allow for logic to be triggered during conversation to gather data or disambiguate intents and entities. During conversation workflow orchestration, a plugin can be used to provide an actual entity reference for an ambiguous one (e.g., flight destination becomes a specific airport) or to calculate new context values (e.g., get latitude and longitude for a given airport, or get weather at a particular latitude/longitude location). In some embodiments, plugins in the framework are triggered by the conversation orchestration creating a Cony ApplCallback referencing various plugin actions. E.g.:

```
{"context":{"ConvApplCallback":
    {
        "actions":["getFlightRouteReference","getCoordinatesForAirportICAO"]
    }
}
```

Plugins may access customer applications via REST services to run on their intranet. Plugins in the framework may be executed by the Conversation Application (110). Results of the plugin may be passed back to the Conversation System (120) to continue workflow orchestration.

The Callback Manager (380) may also cause the Application Workflow (300) to generate a new Application Request (115.x) to the same or a different Conversation System (120) for further processing. Depending on the state of the Dialog Context (165) and/or the result of the Callback Manager's (380) plugin processing, and/or the Application Response (145.x) from the Conversation System (120), the Application Orchestration (310) may determine if a Client Response (180) should be issued, or whether further application workflow is required and forward control to the Application Workflow (300), or it may decide to return an Application Request (115.x) to the Conversation System's (120) Conversation Workflow Orchestration's (170) Conversation Workflow (320). If this Application Request (115.x) contains a response to a callback (or when the Application Request contains errant content), the Conversation Workflow (320) forwards a Workflow Response (370) to the Conversation Orchestration (350) to resume Dialog Context (165) state evaluation, or to evaluate and address the error, and to then determine whether suspended workflow should resume as planned, change (e.g., by calling on an optional Micro-Service Proxy (340.x)), or if an Application Response (145.x) should be generated.

A Client Application (100) issues a Client Request (105) to invoke a Conversation Application (110) to initiate a dialog turn in a conversation thread. The Conversation Application (110) conducts Application Workflow Orchestration (175) which either invokes the Callback Manager (380) or communicates Application Requests (115.x) to a Conversation System (120) to perform conversation related workflow tasks using Conversation Workflow Orchestration (170) of Conversation Micro-Services (130.x). Application Responses (145.x) are returned to the Conversation Application where its Application Workflow Orchestration (175) determines what application tasks are required and eventually responds to the Client Application (100) with a Client Response (180).

The overall system in some embodiments comprises the following components:
I. Conversation Application (110)
   a. Application Workflow Orchestration (175)
     i. Application Workflow (300)
       1. Calls upon Callback Manager or issues Application Request (115.x) to Conversation Workflow (320) via Conversation System's (120) Conversation Workflow Orchestration (170)
     ii. Application Orchestration (310)
       1. Issues Client Response (180) to Client Application (100) or returns control to Application Workflow (300)
   b. Callback Manager (380)
     i. Calls upon Plugin Registry
     ii. Manages Callback states
     iii. Updates Dialog Context (165)
   c. Plugin Registry (390)
     i. Plugins (395.x)
       1. Issues Business Requests (148.x) to Business Applications (150.x) or Micro-Service Requests (160) to Conversation Micro-Services (130.x)
       2. Processes Business Responses (155.x) or Micro-Service Responses (163)
       3. Updates Dialog Context (165)
II. Conversation System (120)
   a. Conversation Workflow Orchestration (170)
     i. Conversation Workflow (320)
       1. Issues Conversation Request (330.x) to Micro-Service Proxies (340.x)
       2. Forwards Application Request (115.x) as a Workflow Response (370) to Conversation Orchestration (350) when workflow is suspended for a callback
       3. Sends Errors to Conversation Orchestration (350)
       4. Updates Dialog Context (165)
     ii. Conversation Orchestration (350)
       1. Updates Dialog Context (165)
       2. Evaluates Dialog Context (165) state
       3. Alters conversation workflow
       4. Issues Workflow Request (360) to Conversation Workflow (320)
       5. Issues Application Response (145.x)
   b. Micro-Service Proxies (340.x)
     i. Constructs the Micro-Service Request (125.x) request body
     ii. Issues Micro-Service Requests (125.x) to Conversation Micro-Services (130.x)
     iii. Processes Micro-Service Response (135.x) to update Dialog Context (165)
     iv. Issues Conversation Response (345.x) to Conversation Orchestration (350)

In some aspects, the separation of the conversation components as Cloud Functions or Application API's from the proxies used to represent them in the conversation workflow enables them to be extended and enhanced without interrupting the design of the conversation flow. This separation permits concurrent execution of multiple conversation threads and distributes the performance load to the Cloud, improving availability and response time. It also allows the proxy to emulate a conversation component that has not been developed or deployed, allowing the conversation application to be prototyped and later adopt the work in progress conversation components under development.

Conversation Application

The Conversation Application, in some aspects, is responsible for: managing requests from the conversation application; interfacing with business applications via plugins to gather data on behalf of the conversation workflow orchestration; managing access credentials needed for micro-service invocation; routing and invoking the conversation workflow orchestration; forwarding user, session, and conversation thread identification and context data between the conversation application and the conversation workflow orchestration; performing application orchestration across multiple conversation workflow orchestrators (e.g., for multi-agent communications); responding to the conversation application.

Conversation Application Orchestration

The request processing in the conversation application may include forwarding a request from a conversation application to a single conversation workflow orchestrator to derive a response, then returning the response to the conversation application. In some cases, the request may include context that allows the conversation application to pick from several conversation system workflow orchestrators to determine which is best to service the request. In situations where a request from the conversation application requires processing by more than one conversation workflow orchestrator, the conversation application can use asynchronous communications to issue requests and process their responses. In some embodiments, the choice of conversation workflow orchestrator(s) is based on application orchestration logic used to review the request's context and utterance. Furthermore, application orchestration logic is used to review responses solicited from multiple conversation workflow orchestrators to determine the best responses to be returned to the conversation application.

Conversational System Workflow Orchestration

Workflow Orchestration is performed by identifying a sequence of workflow steps, each referencing a conversation micro-service to be invoked. A workflow pointer is used to identify which step (or set of steps) is to be executed next. The Workflow component is responsible for executing the next workflow step(s) while the Orchestrator is responsible for assessing the results of the step(s) to determine what should happen next. The Orchestrator uses a combination of rules, pattern matching, and inferencing to make this determination. In cases where multiple steps are to occur in parallel, the Orchestrator is responsible for gathering/managing results from these steps before allowing the conversation thread's workflow to progress.

Conversational System Conversation Orchestration

Conversation Orchestration provides the necessary analytics to assess context and conversation thread status, and the necessary workflow manipulations to revise the workflow to ensure a response can be produced. Conversation Orchestration can assess whether the current NLU micro-services have succeeded in identifying the intent and entities for the provided utterance and elect to invoke additional NLU micro-services. Conversation Orchestration can also determine whether disambiguation is required (e.g., when multiple entities have been derived from the same portion of the utterance—New York might be identified as both a State and a City entity reference). Orchestration for micro-services can determine whether a callback to a plugin is required to gather additional business application context data (e.g., during a flight the pilot may ask "what is the weather at our destination" and the flight management application would need to provide the location of the flight's current destination, its time of arrival, and a weather service could then provide the forecast weather there). Conversation Orchestration can determine when to return a response to the conversation application and when to continue with the workflow. Conversation Orchestration can also address requests to cancel the current conversation thread, or when a request for help has been issued causing workflow to be suspended and help information returned by the conversation application.

Orchestration logic is applied on messages as they are received by the Conversation System Orchestrator. In some embodiments, there are three classes of logic: pre-processing, step specific, and post-processing. Pre-processing logic is applied for every message received. They can determine a message should be returned to the Conversation Application for further processing (e.g., for a callback to invoke an application plugin or for actions like cancel or help). Step specific logic is only applied to messages arriving from a particular micro-service step. These may address context updates or workflow routing decisions to invoke optional micro-services, or to skip backward or forward in the workflow to continue processing. Post-processing logic is applied after the appropriate step specific logic has been executed and when the message being reviewed has not been selected to be returned to the Conversation Application for further processing. In cases where step specific logic may have added a request for a callback to be executed, the post-processing logic can direct the message back to the Conversation Application.

Micro-Services

Micro-services provide the logic and inferencing for conversation services. The power of the conversation system is its ability to leverage multiple micro-services to support the conversation application. In some embodiments, micro-services encompass natural language understanding (NLU), processing (NLP) and any of the conversation patterns, which evolve context and generate responses, e.g., Question/Answering, Frame Flow, Table Flow, Multi-Agent Flow, Bipartite Flow, Forest Flow, Web Flow, and/or Graph Flow. For example, a frame flow type inference engine may be used for interaction with transactional content where there are a finite number of intents, and a small number of entity roles per intent, and an unrestricted, free flow for filling the transaction form is required. A set flow type inference engine may be used for interaction with items sharing common attributes (e.g., in a retail store, clothing). There may be a large number of entities, large number of entity classes, e.g. shirts, pattern, size, and others, requiring an unrestricted, free flow attribute choices. The inference engine may dynamically find the optimum next question, to minimize the number of steps needed to complete a purchase, and the policies can be scripted and/or trainable. A forest flow type reference engine may be include multiple trees or networks that represent the logic for case based reasoning such as technical support problem determination, medical diagnostics, and/or others. Characteristics may include large numbers of conditions (nodes) and large numbers of trees/networks, users unfamiliar with the domain providing ambiguous or unknown responses (e.g., I don't know, out of turn answers, recall, and errors), heavy task ambiguity. The forest flow type inference engine supports multiple path hypothesis search and semantic matching. An RDB flow type inference engine may be used to interact with Relational Databases (RDB's). A semantic representation for the application may be reconstructed from the existing RDB schema. This may involve implicit flow derivation with semantic matching and query matching. A Web flow type inference engine may be used to interact with the semi-structured information on Web pages by reconstructing a semantic representation for the application from the existing web site schemas. This may involve implicit flow derivation for the Conversational Web, using semantic matching and knowledge graph query matching.

Micro-services may incorporate machine learning based on conversation history or other domain knowledge necessary to understand the utterance or provide responses. The micro-services may be trained and tuned independently of the conversation system and deployed or updated as needed. In some embodiments, Each micro-service has logic for communications (how to connect and call the REST service): protocol, hostname (or Internet Protocol (IP) address), port number, REST Verb (e.g., POST, GET, PUT), entry point (Uniform Resource Identifier (URI) following protocol://hostname:port in the Uniform Resource Locator (URL)); basic authentication user identifier (userid) and password (e.g., referenced as an Identity); timeout (e.g., milliseconds). In some embodiments, each micro-service also has logic for parameter mapping (how to copy context data into the REST call parameters); response mapping (how to copy response data into the context (or other msg.payload variables); and orchestration logic (e.g., in addition to pre-processing and post-processing rules that apply to the all micro-services, each micro-service can have its own set of orchestration rules that react to the state of the msg.payload data (context, output, or other values). This allows for micro-service state logic to alter workflow, make a callback to a plugin in the Conversation Application, or to further adjust the msg.payload before continuing with the workflow (or responding to the user via the Conversation Application).

In some embodiments, all of the above types of micro-services other than Question/Answering employ some degree of inferencing to generate intermediate responses to help guide the client to the desired response. An advantage of inference-driven conversation patterns is they are less brittle than rule-based dialog flows as they can adapt to change without the ripple effect requiring reevaluating rule logic. They can also be easier to configure than rule-based dialog flows because the focus is on the data source and data organization and not as much on anticipating the conversation inquiry and how to generate the corresponding response.

Components shown in FIGS. 1, 2 and 3 may run on or implemented on one or more hardware processors such as a central processing unit (CPU), a graphic process unit (GPU), and/or a Field Programmable Gate Array (FPGA), an application specific integrated circuit (ASIC), and/or another processor, may be coupled with a memory device, and process conversion logic as described above. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device may, for example, store instructions and/or data for functioning of the one or more hardware processors, and may include an operating system and other program of instructions and/or data. The one or more hardware processors may be coupled with interface devices such as a network interface for communicating with remote systems, for example, via a network, and an input/output interface for communicating with input and/or output devices such as a keyboard, mouse, display, and/or others.

Figure 7:
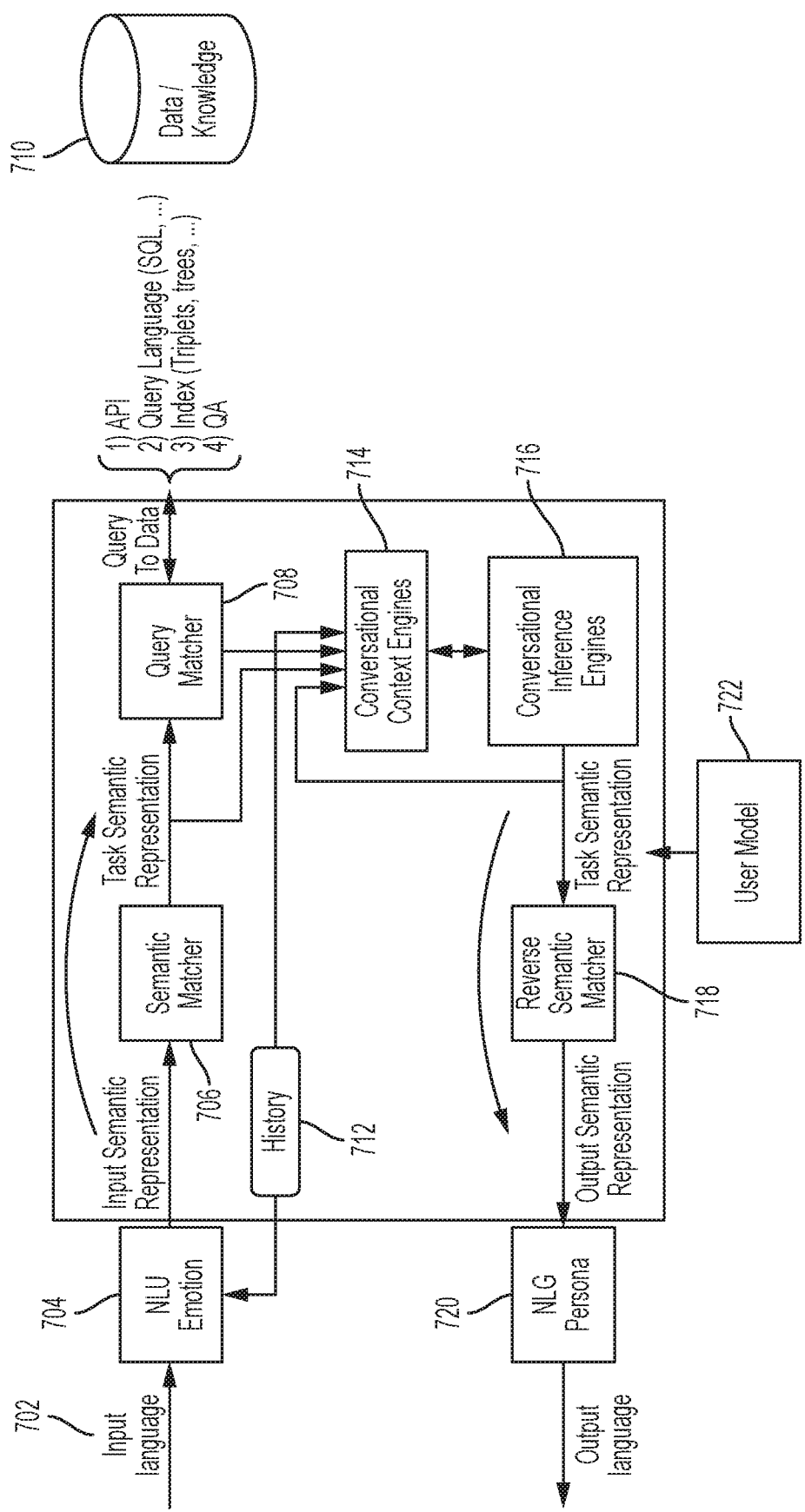
FIG. 7 is a diagram illustrating architecture of a conversation system in one embodiment.

FIG. 7 is a diagram illustrating architecture of a conversation system in one embodiment. An input language (e.g., user utterance or input) 702 is processed by natural language processing component 704 that identifies elements of the utterance that can provide semantic meaning to terms that the pipeline can respond to. For example, the question: "This American President was shot fallen in 1865" may be characterized by features like a determinant (This—which identifies what is being sought as a response), a noun (President) and its adjective (American), a year identification (1865) and "shot fallen" the verb and an adjective forming an idiom. A part of speech (POS) tagger provides:

DT This NNP American NNP President VBD was VBN shot JJ fallen IN in CD 1865.

A semantic matcher 706 takes the above NLU features of the input and matches them to a set of possible terms (meanings) that are related to the task. For example, a famous person would have a country of origin, a date of birth or demise, a particular type of job, and/or other term attributes. In the above example, the semantic matcher 706 identifies that the target of the question is to find a famous person who is a "PRESIDENT", for "COUNTRY" being America, with YEAR_OF_DEMISE being 1865, and the "Shot Fallen" idiom being equivalent to "ASSASINATED".

A query matcher 708 takes the task semantic representation and maps it to an appropriate query for the database. For the above example, a possible query could be:

SELECT FIRST_NAME, LAST_NAME
FROM FAMOUS_PEOPLE_TABLE
WHERE JOB='PRESIDENT' AND COUNTRY='USA' AND YEAR_OF_DEMISE='1865' AND METHOD_OF_DEMISE='ASSASINTATED';

If multiple answers are returned, the semantic matcher 706 may rank them and return the answer to the user. While the above query illustrated a SQL query to data or knowledge base 710, other queries may be formulated as an API, Indexing of trees, and/or question and answer techniques.

A history 712 and context engine 714 may include dialog context, for example, user input from previous interactions, along with the semantic analysis and possible query results and previous answers from the conversational system. This allows the user of the context and history, for example in advanced NLU components for reference and resolution to past provided entities and values, to resolving ambiguities like ellipses and anaphora. Part of the history is also the user model which may have user preferences (e.g., preferred seats or meals when flying).

A conversational inference engine 716 may decide the next step in the interaction with the user based on: the dialog context and the results of the NLU 704, the semantic matcher 706 and the query matcher 708 for the current user input 702. The inference engine 716 applies a policy as to what to ask the user next or what answer to provide the user so as to promote the dialog towards the accomplishment of the goal. The ambiguity of the user input may be a result of language ambiguity, partial information, or lack of understanding on the part of the user about the possible options. The inference engine evaluates several hypotheses based on the current input and context, and finds the appropriate next action that identifies the correct hypothesis and determines from the user all the parameters supporting the hypothesis.

The answer generation (reverse semantic matcher 718 and natural language generator 720): So far, as part of the inference engine (e.g., DialogFlow) a conversational system, the responses may be scripted or may be the result of the query to the database 710. More complex interaction with a user may include adjusting the response based on the expertise and profile of the user 722, the context and number of turns so far, the number of turns expected to complete the task, and/or others (empathic answers, reassuring answers, and/or another). A complete, reverse conversation may be managed by an inference engine to whittle down a large set of results by engaging the user to provide more specific selection criteria.

Conversational inference engines 716 define the decomposition of the conversational problem into pattern based conversational sub-problems based on the structure of underlying data representations or the patterns of human interaction with such data or the application. In some embodiments, the connection between the type of knowledge base and task on one hand, and the conversational interaction on the other are linked to provide the appropriate way to design task specific and knowledge specific reusable inference engines that simplify conversational interaction. Table 1 shows the type of knowledge representation and the corresponding inference engine that has been identified as its corresponding conversation component in some embodiments.

As described, a conversation application may manage client requests, perform application orchestration, callbacks, and include registered plugins. A conversation system may orchestrate workflows of micro-services for different applications, e.g., invoke micro-services based on workflow orchestration. Micro-services perform actions and return result. A system of the present disclosure in one embodiment may enable a conversation thread to proceed through various turns between the client application and the system. The system allows for a suspension of a conversation thread to call on plugins or to retrieve a response via a client application before resuming workflow orchestration. In some aspects, the system may be used as a micro-service allowing for orchestration of workflows across different applications, enable pass-through conversation between the client application and framework acting as a micro-service, enable visibility of the results returned from the completed sub-conversation thread for processing in the calling framework's orchestration, and preserve a sub-conversation's content enabling other calls to framework applications as a micro-services.

Figure 8:
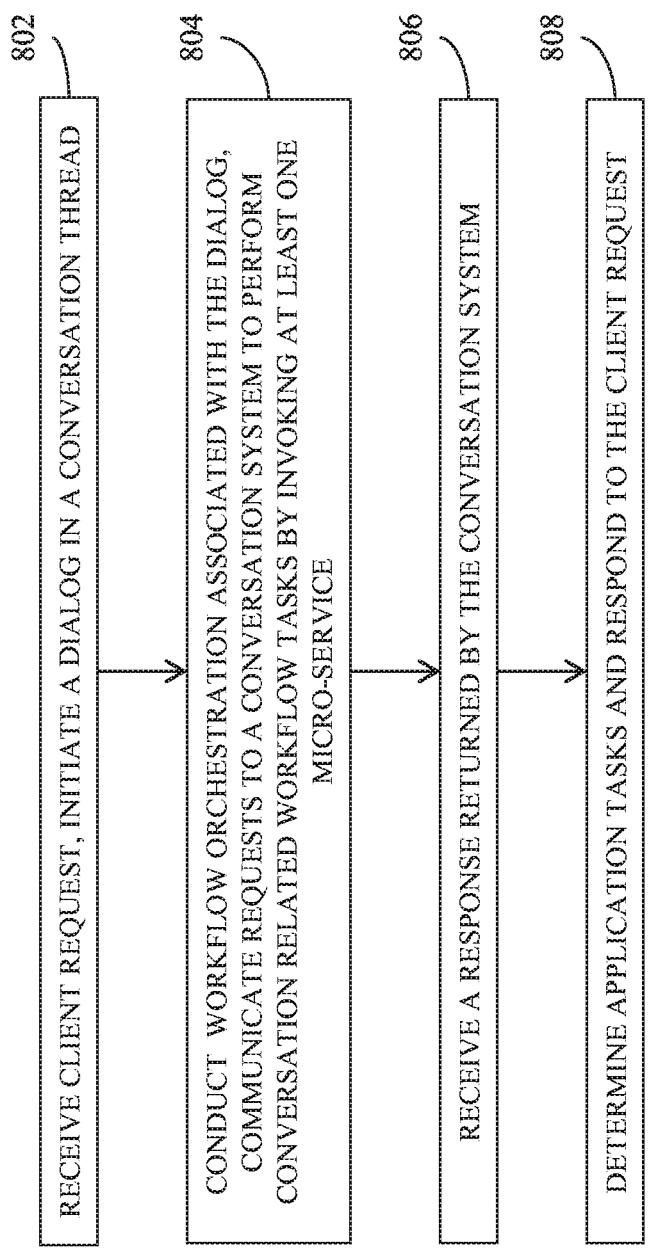
FIG. 8 is a diagram illustrating a method flow of a conversational system in one embodiment.

FIG. 8 is a diagram illustrating a method flow of a conversational system in one embodiment. The method may be executed by or run on one or more hardware processors. At 802, a client request is received by a conversation application and the conversation application may initiate a dialog in a conversation thread. At 804, workflow orchestration associated with the dialog is conducted. The workflow orchestration communicates requests to a conversation system to perform conversation related workflow tasks by invoking at least one micro-service. At 806, the conversation application receives a response returned by the conversation

TABLE 1

| Knowledge Pattern | Inference Engine |
| --- | --- |
| API (e.g., Transactional) | Frame Flow (declarative, short and readable code) |
| Tables (Items in a retail store, e.g., clothing) | Table Flow (Dynamically find the optimum question, trainable) |
| Multiple Trees/Networks (e.g., Technical Support Problem determination, Medical Diagnostics) | Forest Flow (multiple path hypothesis search, semantic matching) |
| Any (limited by the lower threshold of chat-flow for handling complex tasks) | One-Shot-Learning for Chat-flow - Existing Directed Dialog in WCS |
| Knowledge Graphs | Knowledge Graph Inference |
| Relational Databases | Implicit Flow: Conversational RDB (Deep Learning Semantic Match) |
| Web pages | Web-flow |
| Many to Many Symptom to Problem Bipartite Graph (Tech Support, Medical Diagnostics) | Bipartite-Graph Flow: Bayesian Inferencing, Machine Learning |
| Any (e.g., Transactional, RDB, Tech Support) Learning from Human-to-Human interactions | End-To-End Flow (Deep Learning Sequence to Sequence) |

An orchestrator component may include multiple inference engines. For example, a conversational e-commerce application can have possibly 3 inference engines: a DialogFlow for the chit-chat with the user, a TableFlow that assists the user to find the desirable item, and a FrameFlow that assists the user to complete the purchase transaction. Orchestrating across them based on the progress of the conversation with the user may provide success of the automated dialog system and keep the separation between application logic and conversational logic.

The reverse semantic matcher 718 maps task semantic representation output by the conversational inference engine(s) to output semantic representation. The natural language generator 720 generates an output natural language corresponding to the semantic representation.

system as a result of invoking the at least one micro-service. At 808, the conversation application determines application tasks and responds to the client request based on the response returned by the conversation system.

In some embodiments, the response returned by the conversation system may include a callback request, and responsive to receiving the callback request, the conversation application invokes a plugin application. In some embodiments, while the plugin application is invoked via the conversation application, the conversation related workflow tasks associated with the conversation thread being performed in the conversation system are suspended. In some embodiments, the plugin application's result is returned to the conversation system, and the conversation related workflow tasks resume in the conversation system. A dialog context may be built based on results of the conversation related workflow tasks. Micro-services may include one or more of inference engine, hypotheses search, natural language understanding, semantic matcher, query generation and response generation components. In some embodiments, a micro-service may be accessed via a micro-service proxy coupled with the conversation system.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
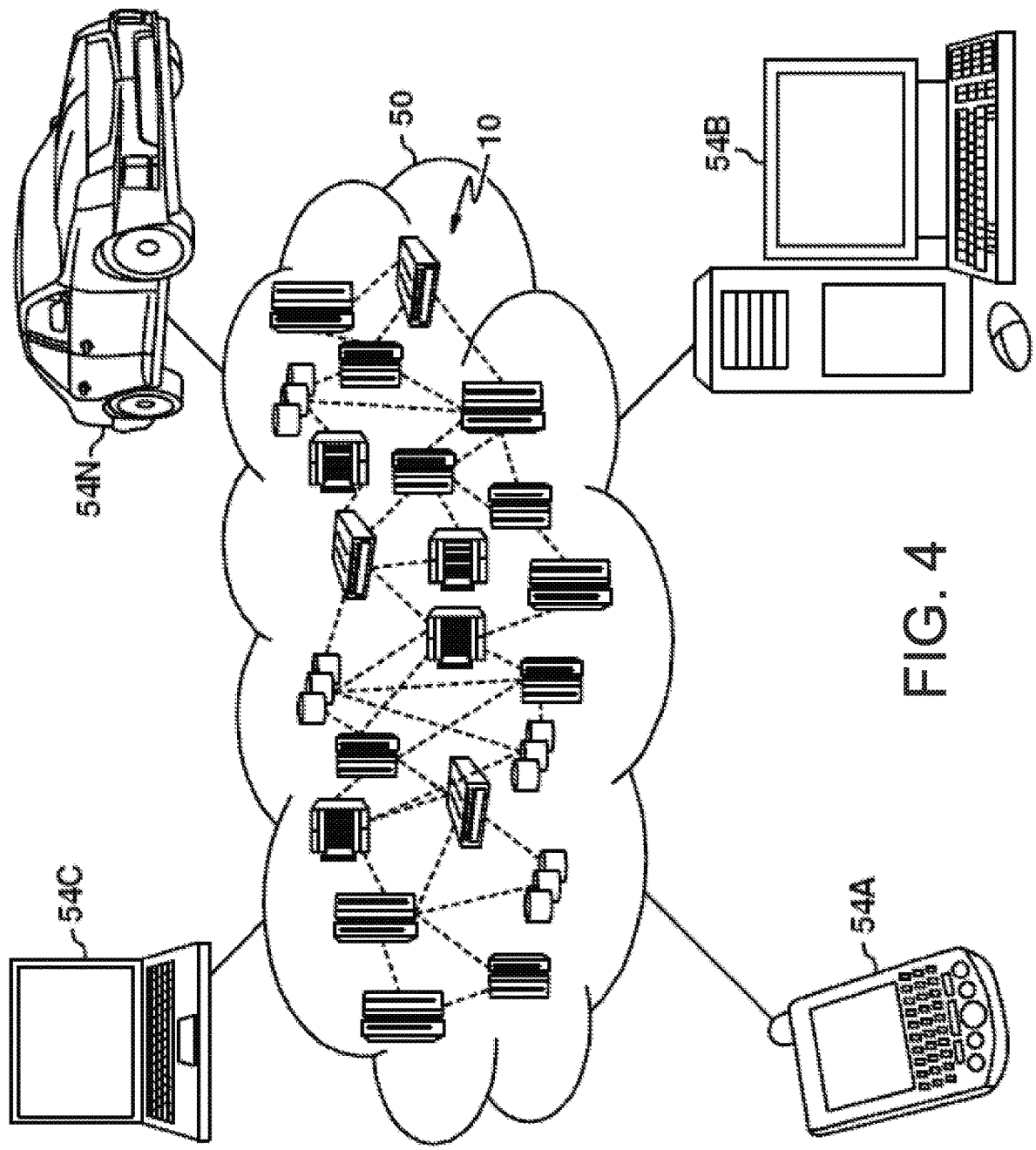
FIG. 4 illustrates a cloud computing environment in one embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
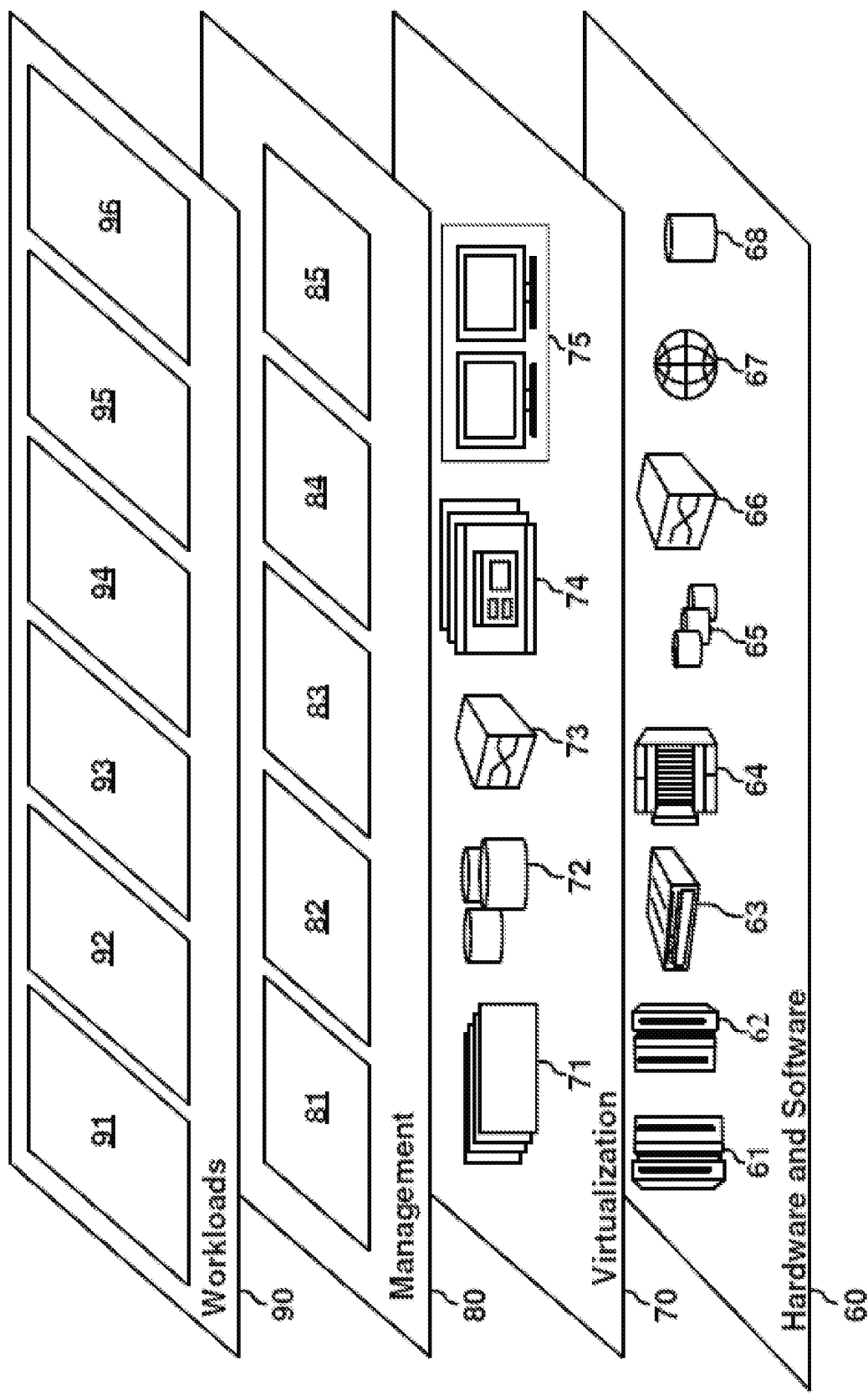
FIG. 5 illustrates a set of functional abstraction layers provided by cloud computing environment in one embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conversation system processing 96.

Figure 6:
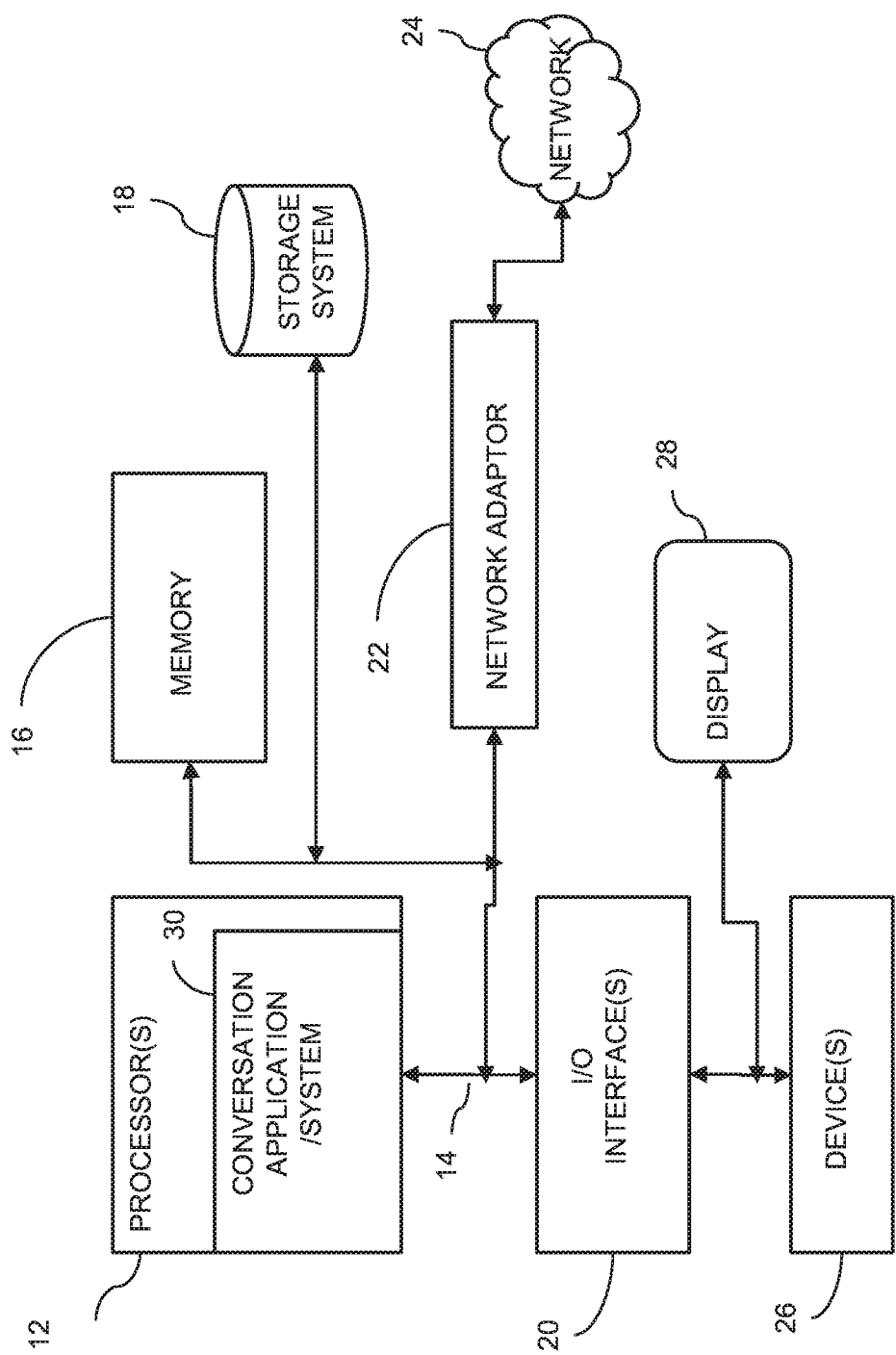
FIG. 6 illustrates a schematic of an example computer or processing system that may implement a conversation system in one embodiment of the present invention.

FIG. 6 illustrates a schematic of an example computer or processing system that may implement a conversation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules 30 that perform the methods described herein. The one or more modules 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method executed by at least one hardware processor, comprising:
   receiving from a client application a client request by a conversation application and initiating a dialog in a conversation thread;
   conducting by the conversation application, a workflow orchestration associated with the dialog, the workflow orchestration communicating requests to a conversation system to perform conversation related workflow tasks by invoking at least one micro-service, the conversation system further invoking a hypothesis search of a dialog context, the dialog context including at least a result of said at least one micro-service, to decide on a predicted dialog path from available options provided in a conversation workflow orchestration toward completion of a goal of the dialog, the conversation application and the conversation system being separate modules, the conversation application handling entity specific application logic and the conversation system handling conversational logic associated with the client request, the conversation application gathering entity specific data to cause the dialog context to be updated; and
   receiving by the conversation application a response returned by the conversation system as a result of invoking the at least one micro-service, the conversation application determining application tasks and responding to the client request by responding to the client application based on the response returned by the conversation system,
   wherein the response returned by the conversation system includes at least a callback request to be executed for disambiguation, and a result of the callback request augments context of the dialog in responding to the client request.

2. The method of claim 1, wherein responsive to receiving the callback request, the conversation application invokes a plugin application, the plugin application including customer generated code registered to perform services.

3. The method of claim 2, wherein while the plugin application is invoked via the conversation application, the conversation related workflow tasks associated with the conversation thread being performed in the conversation system are suspended.

4. The method of claim 3, wherein the plugin application's result is returned to the conversation system, and the conversation related workflow tasks resume in the conversation system.

5. The method of claim 1, wherein a dialog context is built based on results of the conversation related workflow tasks.

6. The method of claim 1, wherein the at least one micro-service comprises one or more of inference engine, natural language understanding, semantic matcher, query generation and response generation components.

7. The method of claim 1, wherein the at least one micro-service is accessed via a micro-service proxy coupled with the conversation system.

8. A computer program product comprising a computer readable storage medium having program instructions embodied therewith, wherein the computer readable storage medium is not a transitory signal per se, the program instructions readable by a device to cause the device to perform a method comprising:
   receiving from a client application a client request by a conversation application and initiating a dialog in a conversation thread;
   conducting a workflow orchestration associated with the dialog, the workflow orchestration communicating requests to a conversation system to perform conversation related workflow tasks by invoking at least one micro-service, the conversation system further invoking a hypothesis search of a dialog context, the dialog context including at least a result of said at least one micro-service, to decide on a predicted dialog path from available options provided in a conversation workflow orchestration toward completion of a goal of the dialog, the conversation application and the conversation system being separate modules, the conversation application handling entity specific application logic and the conversation system handling conversational logic associated with the client request, the conversation application gathering entity specific data to cause the dialog context to be updated; and
   receiving by the conversation application a response returned by the conversation system as a result of invoking the at least one micro-service, the conversation application determining application tasks and responding to the client request by responding to the client application based on the response returned by the conversation system,
   wherein the response returned by the conversation system includes at least a callback request to be executed for disambiguation, and a result of the callback request augments context of the dialog in responding to the client request.

9. The computer program product of claim 8, wherein responsive to receiving the callback request, the conversation application invokes a plugin application.

10. The computer program product of claim 9, wherein while the plugin application is invoked via the conversation application, the conversation related workflow tasks associated with the conversation thread being performed in the conversation system are suspended.

11. The computer program product of claim 10, wherein the plugin application's result is returned to the conversation system, and the conversation related workflow tasks resume in the conversation system.

12. The computer program product of claim 8, wherein a dialog context is built based on results of the conversation related workflow tasks.

13. The computer program product of claim 8, wherein the at least one micro-service comprises one or more of inference engine, natural language understanding, semantic matcher, query generation and response generation components.

14. The computer program product of claim 8, wherein the at least one micro-service is accessed via a micro-service proxy coupled with the conversation system.

15. A conversational system comprising:
a conversation application executing on at least one hardware processor and providing application workflow orchestration, the conversation application receiving from a client application a client request and sending one or more application requests based on the application workflow orchestration;
a conversation system executing on at least one hardware processor and providing conversation workflow orchestration, the conversation system receiving the one or more application requests,
the conversation application and the conversation system being separate modules, the conversation application handling entity specific application logic and the conversation system handling conversational logic associated with the client request, the conversation application and the conversation system developing dialog context and storing the dialog context in a memory device, the conversation application gathering entity specific data to cause the dialog context to be updated, the conversation application and the conversation system developing the dialog context by engaging with a plurality of micro-services, at least one micro-service of the plurality of micro-services classified as an inference engine and at least another micro-service of the plurality of micro-services classified as a hypothesis search, the conversation application generating a response to the client request by responding to the client application based on the developed dialog context, the conversation system further invoking a hypothesis search of the dialog context, the dialog context including at least results of the plurality of micro-services, to decide on a predicted dialog path from available options provided in the conversation workflow orchestration toward completion of a goal of the dialog.

16. The conversational system of claim 15, wherein multiple instances of the conversation application and conversation system run simultaneously to service multiple client requests.

17. The conversation system of claim 15, wherein at least one micro-service of the plurality of micro-services comprises one or more of inference engine, natural language understanding, semantic matcher, query generation and response generation components.

18. The conversation system of claim 15, wherein the conversation application further comprises a plugin registry comprising a plurality of plugins registered with the conversation application, wherein the conversation application invokes a plugin based on receiving the callback request from the conversation system.

19. The conversation system of claim 15, wherein the conversation system further comprises at least one micro-service proxy via which at least one micro-service of the plurality of micro-services, is invoked.

20. The conversation system of claim 19, wherein the at least one micro-service proxy transforms the dialog context into a micro-service request.

* * * * *